United States Patent [19]

Kurtz et al.

[11] 4,442,717
[45] Apr. 17, 1984

[54] COMPENSATION AND NORMALIZATION APPARATUS FOR SHEAR PIEZORESISTIVE GAGE SENSORS

[75] Inventors: Anthony D. Kurtz, Englewood; Joseph R. Mallon, Franklin Lakes, both of N.J.

[73] Assignee: Kulite Semiconductor Products, Inc., Ridgefield, N.J.

[21] Appl. No.: 419,903

[22] Filed: Sep. 20, 1982

[51] Int. Cl.³ .......................... G01B 7/18; G01D 3/04
[52] U.S. Cl. ........................................ 73/766; 73/777; 73/862.67
[58] Field of Search .......... 73/862.63, 862.66, 862.67, 73/862.68, 765, 766, 777, 708, 721, 727; 357/26; 338/3, 4

[56] References Cited

U.S. PATENT DOCUMENTS

| 3,123,788 | 3/1964 | Pfann et al. ...................... 357/26 X |
| 3,213,681 | 10/1965 | Pearson ............................. 73/777 X |
| 3,922,597 | 11/1975 | Nagase .............................. 73/766 X |
| 4,331,035 | 5/1982 | Eisele et al. ........................... 73/765 |
| 4,333,349 | 6/1982 | Mallon et al. .................... 73/727 X |

FOREIGN PATENT DOCUMENTS

| 24035 | 2/1981 | European Pat. Off. .............. 73/777 |
| 1472294 | 5/1977 | United Kingdom .................. 73/777 |

*Primary Examiner*—Charles A. Ruehl
*Attorney, Agent, or Firm*—Arthur L. Plevy

[57] ABSTRACT

Compensating apparatus for a shear gage transducer employing a piezoresistor. The shear gage transducer or sensor is of a cross-shaped planar configuration where a lack of symmetry in structure or in fabrication undesirably provides offsets at the output terminals associated with the horizontal cross arm. The compensating apparatus includes a series chain of resistors positioned between selected terminals of said sensor to provide a desired null output voltage over a temperature operating range. Further embodiments depict a shear sensor having a unique contact configuration to enable resistive compensation of undesired offsets.

17 Claims, 5 Drawing Figures

COMPENSATION AND NORMALIZATION APPARATUS FOR SHEAR PIEZORESISTIVE GAGE SENSORS

BACKGROUND OF INVENTION

This invention relates to compensation apparatus for a piezoresistive sensor employing the shear stress effect.

The prior art has been cognizant of the fact that a single resistive device could be adequately employed as a pressure sensor. In regard to such operation it was determined that if a longitudinal current is caused to flow through a cross-shaped element then a transverse voltage is generated in such a piezoresistive device subjected to pressure. This voltage can be detected via voltage contacts located at opposite edges of the piezoresistor. As indicated, the effect is well known and has been widely described in technical literature and shown in various patents. Thus, it was determined that a complete measurement of the biaxial stress or shear stress can be obtained using a simple gage of a cross or X shaped configuration. This structure indicates a single resistor of such a configuration deposited on a diaphragm and which resistor will provide a voltage output proportional to a pressure applied to the diaphragm. The concept and structure has been depicted in a paper entitled Semiconductor Stress Transducers Using Transverse and Shear Piezoresistance, by W. G. Pfann and R. W. Thurston, *Bell Telephone System Technical Publication* (Monograph 4056) (1961). In this publication there is shown on Page 3, FIG. 2 a semi-conductor gage for the measurement of strain or biaxial stress.

The device as well as the theory of operation is further explained in detail in U.S. Pat. No. 3,123,788 entitled Piezoresistive Gage issued on Mar. 3, 1964 to W. G. Pfann et al. As one can see from the structure, the device depicted is essentially a single resistance of a cross-like shape secured to a suitable diaphragm. The device is biased via an excitation voltage applied between the vertical arms this voltage generating a longitudinal current and a voltage indicative of applied pressure is derived across the horizontal arms or terminals. A further example of such a device is depicted in U.S. Pat. No. 4,317,126 entitled Silicon Pressure Sensor which was issued on Feb. 23, 1982 to J. E. Graff, Jr. The operation and structure of this device is essentially identical to those above described.

In any event such devices tend to exhibit good balance and temperature operation if they are completely symmetrical in all respects. However, this aspect is beyond the capability of modern day technology. Therefore, in spite of such representations by the prior art, the so-called shear gage exhibits undesired offsets which are temperature sensitive and which considerably affect the operation of such pressure sensors.

It is therefore an object of the present invention to provide improved apparatus for compensating and normalizing the output of a shear gage configuration as above described.

BRIEF DESCRIPTION OF THE PREFERRED EMBODIMENT

In a shear pressure sensor of the type having a cross-shaped configuration including a central vertical arm having top and bottom contacts for receiving an excitation voltage and a horizontal arm located near the center of said vertical arm and relatively perpendicular thereto and having on each end a contact for providing an output voltage across said horizontal arm due to a current flow through said vertical arm and proportional to a force applied to a flexible diaphragm upon which said pressure sensor is located, the combination therewith of apparatus for compensating and normalizing the output voltage, comprising impedance means coupled between one of said arms and another of said arms of said pressure sensor and operative to provide a compensated output whereby said output voltage from said sensor exhibits a predetermined null for a zero pressure condition over a specified temperature range.

DETAILED DESCRIPTION OF THE INVENTION

Figure 1:
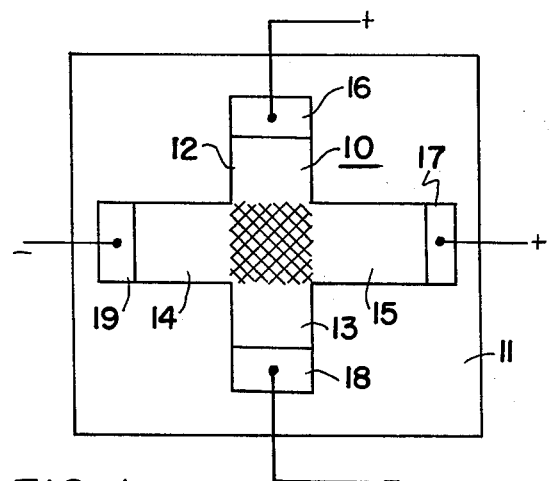
FIG. 1 is a plan view of a shear gage configuration according to the prior art.

Referring to FIG. 1, there is shown one type of pressure sensor according to the prior art which operates to provide an output indicative of applied pressure.

Essentially the device comprises a semiconductor piezoresistor 10 deposited by a conventional semiconductor technique upon a suitable diaphragm 11. The device, as indicated, is of a cross shape having vertical arms 12 and 13 and horizontal arms 14 and 15. It is of course understood that the device 10 can be oriented on the diaphragm 11 according to the crystallographic axis of the diaphragm, if the diaphragm is constructed from a suitable semiconducting material such as silicon. Thus, the device 10 may appear at an angle of 45° to the radius of a circular diaphragm near the periphery which is well known in the prior art and has been both structurally and mathematically explained.

An excitation voltage via a suitable biasing source is applied between the vertical arms 12 and 13. An output voltage is taken across the horizontal arms 14 and 15 which voltage is indicative of the magnitude of pressure or force applied to the surface of the diaphragm 11 to cause it to deflect. As seen in FIG. 1, each arm is terminated in a suitable contact as 16, 17, 18, and 19. The formation of contacts by various techniques are well known in the art. The output voltage derived from the horizontal arms or taps 12 and 13 permits one to detect a transverse voltage due to a current flow from contact 16 and 18, which voltage varies as a function of the diaphragm 11 flexing according to an applied force or pressure.

In any event, as should be apparent, the structure of the device 10 dictates complete symmetry if zero voltage output is to be obtained at zero applied force. Hence, the output arms or taps 14 and 15 are positioned midway between the vertical arm of the cross-shaped structure. Due to conventional manufacturing tolerence, this is not easily accomplished. It should be noted that the total excitation is dropped over the length of the element between terminals 16 and 18. This excitation may be 5 volts. The full scale output of the sensor however may be 100 mv. Therefore a position error of 0.1% on the position will generate a voltage error of 5 mv or 5% of full scale. If this symmetry is not provided, then there will be a voltage offset at the taps 14 and 15 when the diaphragm is not flexed. This voltage will differ from device to device depending upon the fabrication techniques. Essentially, as seen from FIG. 1, the main active region 20 of the device is shown by the cross-hatching. Essentially, the device can be considered to constitute a square or rectangular resistor element having excitation input at the topsides and detection or output terminals at the opposing or vertical sides.

Apart from the geometrical considerations are fabrication considerations. For example, if the resistivity of the central area were not uniform, then the temperature response of the top portion of the device would vary in a different manner than that of the bottom portion of the device. This aspect is further noted in such resistivity variations in the horizontal and vertical directions. This effect will also cause a voltage offset at the output terminals 17 and 19. To further complicate matters, the device 10 may be positioned on a diaphragm which is metal or some other material that does not have a matching or compatible temperature coefficient with the semiconductor material of the device 10. This mismatch will cause the composite structure to exhibit differential expansion or contraction due to temperature changes which again result in considerable offsets.

Thus, in order to provide reliable operation from device to device, one must compensate or correct for the above noted problems which result in improper zero shift and zero balance. The solution is not evident since the shear gage of FIG. 1 is not obviously electrically equivalent to a Wheatstone bridge and moreover it is a 4 terminal device compared to a Wheatstone bridge array which is normally fabricated in an open configuration with 5 or more terminals so that external balancing and compensating resistors may be added. Hence, conventional compensating techniques as used or employed in Wheatstone bridge arrays are not applicable to the shear gage structure.

Figure 2:
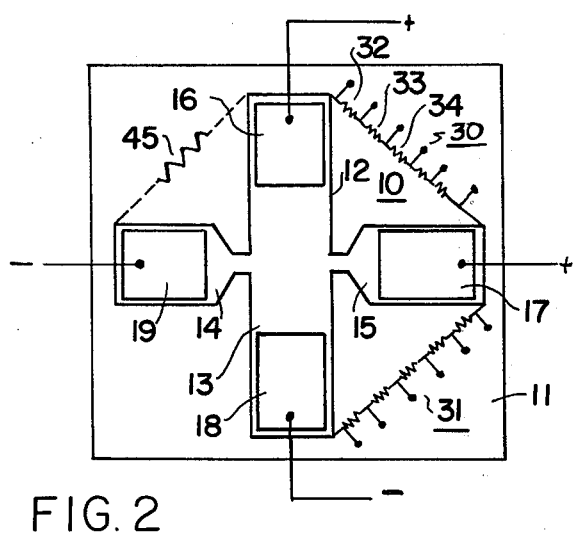
FIG. 2 is a plan view of a shear gage configuration employing compensating apparatus according to one embodiment.

Referring to FIG. 2, there is shown one compensating technique to be employed with the shear gage transducer of FIG. 1. In order to compensate for symmetry and the above described effects, a series chain 30 of resistors is fabricated with the device and arranged between a vertical arm 12 and a horizontal arm 15. The series resistance of the chain is selected of a magnitude which is equal to twenty times or more of the resistance of the shear gage bridge structure 10. Resistance value for the shear gage bridge structure is between 200 and 400 ohms, with 350 ohms being typical. It is, of course, understood that this value can vary depending upon the size of the gage 10. In any event, shear gages as fabricated by semiconductor techniques are typically one or more mils in width and are actually quite wide compared to conventional semiconductor devices. The resistive chain 30, as indicated, is selected to have a magnitude of twenty or more times the bridge resistance indicated, a total series resistance of 7,000 ohms or greater. The resistors in chain 30 are preferably deposited or fabricated by the same device construction techniques used to form the bridge as by diffusion, ion-implantation and so on. Since those resistors are fabricated by the same technique as the piezoresistor elements, they have the same temperature coefficient of resistance. Such large values of resistance are easily provided as the line widths can be of the order of 1/10 a mil or greater due to the size of the gage. The series chain may consist of 4 or 5 resistors as shown between contacts 16 and 17. A second series chain 31 is also fabricated between contact 17 and 18. The values of the resistors are selected to provide an optimum trimming effect for a voltage offset at terminals 17 and 19. Thus, the magnitudes of the resistances can vary according to the following ratios, by way of example only, the first resistor 32 is selected to be about 0.5 the total value, the second resistor 33 about 0.25 the total value, the third resistor 34 about 0.125 the total value, the fourth and fifth resistors constituting about 0.125 the total value. It is, of course, understood that the more resistors employed then the more accurate the trim. Each resistor in the chain has separate terminals to enable the manufacturer to short resistances as needed. In a similar manner each resistor may be pre-shorted and then opened, if needed.

As one can see from FIG. 2, depending upon the initial offset at zero pressure, the voltage between contacts 17 and 19 may be positive or negative. If the voltage is at a null, then neither series chain 30 or 31 shunt the bridge symmetrically and have no effect on the offset of the device. If the voltage is positive, then the series chain 31 is trimmed by shorting out resistors until a null is obtained. For a negative offset then the series chain 30 is trimmed to thereby provide the required initial output at terminals 17 and 19. As indicated above, trimming can be accomplished by shorting resistors to decrease the series resistance between the arms or by opening resistors to increase the resistance between the arms. Such techniques are known in the art and resistor openings can be accommodated by laser techniques while shorting of resistances can be accommodated by bonding techniques. Of course, the offset could have been trimmed by shunting an external resistor across either terminals 16-17 or terminals 17-18, but such a technique would have an extremely adverse effect on the temperature coefficient of offset. This is because the external resistor typically has a near zero TCR or at least a TCR which is not exactly matched to the piezoresistive device and may also be at a different temperature. By example, if the device TCR is 10%/100° F. and the initial zero offset is 50 mv and the device is balanced with an external resistor of near zero TCR then the device will exhibit a temperature coefficient of offset of 5 mv/100° F. This is an unacceptable degradation of the device due to zero balancing. The above configuration is effective because it provides a zero balance that does not cause a worsening and is not interactive with the temperature coefficient of offset because resistors of an identical TCR are employed as shunts.

It is, of course, apparent that if the zero balance is adjusted, one may still have a change in the value due to temperature. This effect may be compensated for by the addition of a shunt element or a resistor as 45 or 46 of near zero TCR applied across terminals 18-19 or 16-19 depending on the sign of the temperature coefficient of offset. As explained above, such a shunt differently loads the device in such a way as to induce a zero offset shift with temperature. This effect may be employed to compensate for any initially observed zero shift by inducing a zero shift of the same magnitude but of opposite sign. Alternately, a suitable temperature variable resistor can be employed with the compensating series string. The temperature coefficient of the resistor is selected according to the resistance change with temperature and either a positive or negative temperature coefficient device can be employed as is understood in the art.

Figure 3:
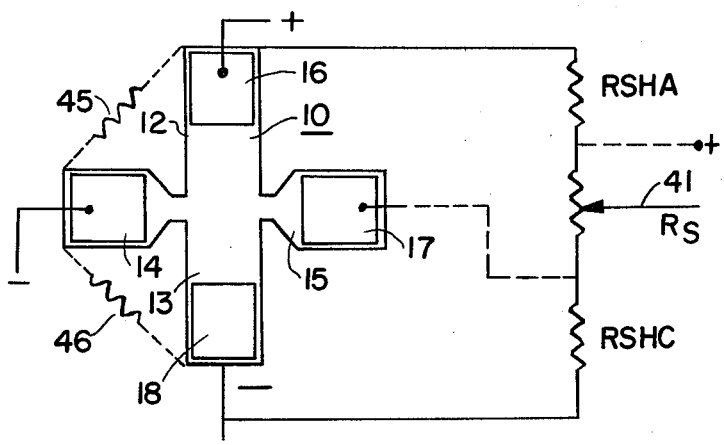
FIG. 3 is a plan view of a shear gage configuration employing an alternate embodiment of compensating apparatus.

Referring to FIG. 3, there is shown an alternate embodiment for balancing the shear gage structure 10.

As is understood from the above description, the offset at the output terminals or vertical arms 17 and 19 may be positive or negative depending upon the symmetry of the device. In FIG. 3, a series path consisting of three resistors designated as $R_{SHA}$, $R_S$ and $R_{SHC}$ appear in shunt between contacts 16 and 18 and effectively serve to shunt the vertical arms 12 and 13 of the gage 10. The total resistive value of the resistor chain is selected to again be twenty times or more the resistive value of the bridge. Resistors $R_{SHA}$ and $R_{SHB}$ are selected to be equal in magnitude with the total resistance being between typically 80% or more of the chain value. Resistor $R_S$ may be variable or may be a series chain of resistors or a single resistor of a given value to provide exact trimming. As one can see from FIG. 3, if the gage is symmetrical, the proper null voltage will appear at the plus (+) output on contact 17. This voltage will also be present at the center or near the center of resistor $R_S$.

If the voltage at contact 17 is negative, indicating an unbalance, a lead (dashed) 40 is connected from contact terminal 17 to the junction between $R_S$ and $R_{SHC}$. The positive output is taken between the junction of $R_{SHA}$ and $R_S$ as shown. If the output at contact 17 is negative, then contact 17 is connected to the junction between resistor $R_{SHA}$ and $R_S$, with the positive output taken between resistor $R_S$ and $R_{SHB}$. It is, of course, understood that if $R_S$ were a potentiometer, then a null voltage could be obtained at the arm 41. However, this approach is expensive, space consuming and vibration sensitive and fixed value resistors are a preferred way of obtaining the proper null. Again, if there is a resistance change with temperature, the null will change for no applied pressure. In this case a temperature responsive resistor is placed in series with $R_{SHA}$ and $R_{SHB}$ to compensate for such variations. It should be clear from the above description that in any practical configuration symmetry of the structure is not easily obtained, and hence, the device 10 must be compensated for such variations. The above described techniques will provide such compensation and render the gage 10 practical for commercial purposes. This circuit provides a minimum of affect on the temperature coefficient of offset particularly if the values of $R_{SHA}$ and $R_{SHC}$ are large compared to the bridge impedance. Of course, any observed temperature coefficient of offset may be compensated with shunting or other techniques as described above.

Figure 4:
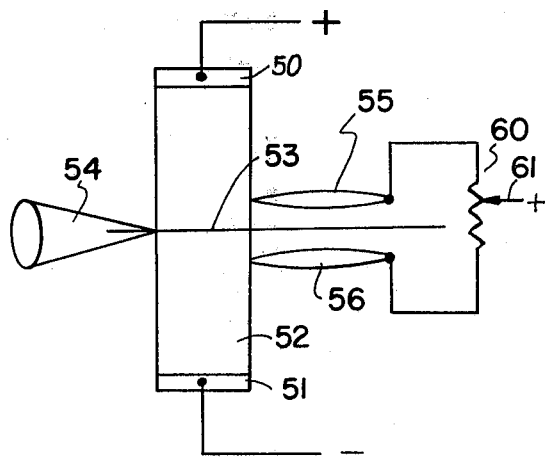
FIG. 4 is a plan view of a shear gage having a unique structure capable of providing compensation.

Referring to FIG. 4, there is shown an alternate structure for a shear gage sensor employing apparatus for providing compensation in zero shift and zero balance. As indicated, the shear piezoresistive effect causes a voltage to be induced due to a transverse current flow from terminal 50 to terminal 51. The gage consists of a suitable semiconductor body 52 fabricated from silicon and formed by correctional techniques as diffusion and so on. The gage thickness is relatively thin as compared to either the horizontal or vertical dimension. For example, the gage body 52 may be fabricated on a monocrystalline silicon wafer and diffused using conventional photolightographic techniques with conventional semiconductor processing techniques to a depth of 3 to 10 microns. Thus, the vertical member is rectangular in shape and may be, for example, 3 mils in width and 9 mils in length. Contacts 50 and 51 are positioned at the top and bottom of the member 52 and are adapted to receive a source of excitation voltage designated by plus (+) and minus (−). Disposed on the left side of the device proximate to the center axis 53 is a first arrow shaped contact 54. Contact 54 may be formed by many techniques and may be an ohmic contact constituting a highly doped, high conductivity region and can then be metallized to provide the capability of coupling the contact 54 via suitable leads. By way of example, the contact 54 may be 3 mils in length. This contact 54 as indicated is coupled to the side of the gage member 52 at a relatively small area due to the contact shape. The output of contact 54 designates the minus (−) output terminal of the device. On the right side there are shown two smaller arrow like contacts 55 and 56 both symmetrically disposed about the center axis 53. Contact 55 is above the axis 53 with contact 56 below the axis 53. Both contacts may be ohmic contacts and are conventionally metallized to allow coupling thereto. The contacts 55 and 56 have a sharp end which as contact 54 touch the sides of the gage member 52 above and below the center axis 53. Coupled between contacts 55 and 56 is a potentiometer device 60 having a variable arm 61. The positive (+) output is taken from the arm 60.

Figure 5:
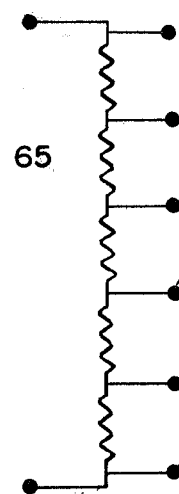
FIG. 5 is a schematic view of a series resistance chain which can be employed with the structure depicted in FIG. 4.

It can thus be seen from FIG. 4 that adjustment of the arm 61 will provide the balance or null voltage required based on the above described non-symmetrical aspects of the device. It is, of course, understood that the potentiometer 50 can be replaced with a series resistance chain 65 as shown in FIG. 5 where the positive (+) output can be obtained from any one of the voltage taps as 62, 63, and so on. It is also seen that a temperature sensitive resistor can be included within the chain 65 to provide for temperature tracking as required. Of course, shunting or other techniques are equally appropriate.

The device of FIG. 4 operates as a transducer and when positioned on a diaphragm, will provide an output between terminals 54 and 61 indicative of the shear stress due to a force applied to the diaphragm. Essentially, diaphragm configurations for such devices are well known and examples of suitable structures are shown in the above noted patents as well as other patents, as U.S. Pat. No. 3,739,315, U.S. Pat. No. 4,025,942, U.S. Pat. No. 4,204,185, all assigned to the assignee herein. In any event, due to the balancing apparatus and techniques depicted one can accommodate the shear gage transducer on various types of diaphragms apart from those fabricated from semiconductor materials as monocrystalline silicon and so on. This is so as the balancing techniques enable one to compensate for zero shift and temperature shift due to the use of the complimentary schemes as described above. The use of metallization techniques and contact formation in regard to the structure depicted in FIG. 4, is completely permissable as the structure shown can be balanced to provide an optimum zero balance and an optimum zero shift. All the above described techniques allow the use of temperature tracking resistances to be employed to further assure optimum operation over wide temperature ranges.

Thus, in consideration of the above specification, there will be other modifications and alternative structures which are deemed to be encompassed within the scope of the claims as appended hereto.

We claim:

1. In a piezoresistive sensor of the type having a cross-shaped configuration including a central vertical arm having top and bottom contacts for receiving an excitation voltage and a horizontal arm located near the center of said vertical arm and relatively perpendicular thereto and having on each end a contact for providing an output voltage across said horizontal arm due to a current flow through said vertical arm and proportional to a force applied to a flexible diaphragm upon which said sensor is located, the combination therewith of apparatus for compensating and normalizing the output voltage, comprising:

impedance means coupled between one of said arms and another of said arms of said sensor and operative to provide a compensated output whereby said output voltage from said sensor exhibits a predetermined null for a zero pressure condition over a specified temperature range.

2. The piezoresistive sensor according to claim 1, wherein said impedance means comprises a series chain of resistors of a total resistance value of at least twenty times greater than the resistance of said sensor.

3. The piezoresistive sensor according to claim 2, wherein said series chain of resistors includes means coupled to said resistor chain for selecting predetermined ones of said resistances.

4. The piezoresistive sensor according to claim 3, wherein at least one of said resistors in said chain is a temperature sensitive resistor.

5. The piezoresistive sensor according to claim 1, wherein said impedance means is a series chain of resistors coupled between one contact on said vertical arm and one contact on said horizontal arm.

6. The piezoresistive sensor according to claim 1, wherein said impedance means is cofabricated with said piezoresistive sensor and has relatively the same temperature coefficient of resistance.

7. The piezoresistive sensor according to claim 1, wherein said impedance means is a series chain of resistors coupled in shunt with said vertical arm and having a junction between two of said resistors in said chain coupled to one of said contacts of said horizontal arm.

8. The piezoresistive sensor according to claim 7, wherein said chain comprises a first resistor of a given magnitude having one terminal coupled to the top contact of said vertical arm and a second terminal coupled to a terminal of a second resistor, with the other terminal of said second resistor coupled to a terminal of third resistor also of said given magnitude, with the other terminal of said third resistor coupled to the bottom contact of said vertical arm, and with the junction between said second resistor and one of said first and third resistors coupled to one of said contacts of said horizontal arm.

9. The piezoresistive sensor according to claim 7, wherein said second resistor is a potentiometer having a variable arm indicative of one output from said horizontal arm.

10. A piezoresistive sensor or gage adapted to be suitably positioned on a force collector and operative in the shear mode, comprising:

a semiconductor member of a rectangular configuration having a first contact on the shorter side and a second contact on the opposite shorter side with said contacts adapted to receive a source of excitation voltage, a third contact coupled to said rectangular member and in contact with said member near the center of one of said longer sides, fourth and fifth contacts coupled to said rectangular member and in contact with said member at said other longer side with one of said contacts located above the center and the other below the center, and impedance means coupled between said fourth and fifth contacts for providing one output terminal from said sensor with said third contact providing the other output terminal.

11. The piezoresistive sensor according to claim 10, wherein said third, fourth and fifth contacts each have a pointed contact edge in contact with said rectangular member.

12. The piezoresistive sensor according to claim 10, wherein said impedance means comprises a potentiometer having a variable arm with a first terminal of said potentiometer connected to said fourth contact and a second terminal of said potentiometer connected to said fifth contact, with said variable arm providing said one output terminal.

13. The piezoresistive sensor according to claim 10, wherein said impedance means comprises a series chain of resistors each having first and second terminals connected in series between said fourth and fifth contacts, with a selected one of said connected terminals providing said one output terminal.

14. The piezoresistive sensor according to claim 10, wherein said impedance means further includes a temperature sensitive element.

15. The piezoresistive sensor according to claim 10, wherein said third, fourth and fifth contacts are ohmic contacts having metallized portions serving as terminals.

16. The piezoresistive sensor according to claim 10, wherein said semiconductor is silicon.

17. In a piezoresistive sensor of the type having a cross-shaped configuration including a central vertical arm having top and bottom contacts for receiving an excitation voltage and a horizontal arm located near the center of said vertical arm and relatively perpendicular thereto and having on each end a contact for providing an output voltage across said horizontal arm due to a current flow through said vertical arm and proportional to a force applied to a flexible diaphragm upon which said pressure sensor is located, the combination therewith of apparatus for compensating and normalizing the output voltage, comprising:

(a) impedance means coupled between one of said arms and another of said arms of said sensor and operative to provide a compensated output whereby said output voltage from said sensor exhibits a predetermined null for a zero pressure condition over a specified temperature range.

(b) temperature compensating means coupled between other arms of said sensor for providing a zero offset shift with temperature.

* * * * *